United States Patent [19]

Poettmann

[11] 3,722,593

[45] Mar. 27, 1973

[54] LIMITING CONTAMINATION IN WASTE DISPOSAL WELLS

[75] Inventor: Fred H. Poettmann, Littleton, Colo.

[73] Assignee: Marathon Oil Company, Findlay, Ohio

[22] Filed: Mar. 29, 1971

[21] Appl. No.: 129,180

Related U.S. Application Data

[63] Continuation-in-part of Ser. No. 873,669, Nov. 13, 1969, Pat. No. 3,606,925.

[52] U.S. Cl. .............................................166/305 D
[51] Int. Cl. ................................................B65g 5/00
[58] Field of Search..166/274, 292, 294, 273, 305 D, 166/307

[56] References Cited

UNITED STATES PATENTS

| 3,493,051 | 2/1970 | Gogarty | 166/274 |
| 3,380,522 | 4/1968 | Payne, Jr. et al. | 166/292 X |
| 3,400,761 | 9/1968 | Latimer, Jr. et al. | 166/274 |

*Primary Examiner*—Stephen J. Novosad
*Attorney*—Joseph C. Herring, Jack L. Hummel and Richard C. Willson, Jr.

[57] ABSTRACT

Contamination of underground aquifers by waste materials injected through disposal wells is limited by injecting a mobility buffer ahead of the waste material. The mobility buffer is an oil-external or water-external micellar dispersion having sufficiently low mobility to inhibit fingering of the waste material. A more favorable mobility ratio can be achieved by injecting a series of consecutively mobility graded dispersions into the aquifer.

13 Claims, No Drawings

LIMITING CONTAMINATION IN WASTE DISPOSAL WELLS

CROSS REFERENCES TO RELATED APPLICATIONS

This is a continuation-in-part of copending application identified as Ser. No. 873,669, filed Nov. 13, 1969, now U. S. Pat. No. 3,606,925.

BACKGROUND OF THE INVENTION

1. Field of the Invention

This invention relates to the disposal of waste materials into aquifers and to containing these waste materials within a given perimeter by using micellar dispersions as mobility buffers. The micellar dispersions are injected ahead of the waste materials to inhibit fingering of the waste materials out into the aquifer.

2. Description of the Prior Art

Disposal of waste materials into fresh water aquifers often presents magnified contamination problems since waste materials, particularly aqueous waste materials, often tend to seek out and establish channels within the fresh water aquifer. These channels may "finger out" in such a fashion and at such a rate that portions of the fresh water aquifer removed from the injection well may be contaminated long before the major portion of the waste material reaches that distant point. This fingering effect is due to the fact that waste materials are often more mobile than the waters of the aquifer, therefore these higher mobility waste materials tend to diffuse to distant parts of the aquifer faster than the water originally in the aquifer.

U. S. Pat. No. 3,380,522 teaches a method of inhibiting the horizontal advance of saline water into fresh water aquifers by injecting into these aquifers a slurry containing granular materials such as reclaimed oil well drilling mud and sedimentary clays. The patent claims that such materials form an impermeable bridging mass in the aquifer and thereby block the intruding contaminating waters. Although this method may effectively block the outflow of contaminating materials into a fresh water aquifer, it limits the volume of the aquifer available in disposal well applications by effectively confining the aquifer to a fixed volume.

The object of this invention is to create a mobile piston-like mobility buffer within the aquifer which can expand as more waste material is injected behind it and yet still prevent the contaminating material from fingering out into the aquifer beyond the edge of the buffer to distant, otherwise uncontaminated, fresh water pumping wells.

SUMMARY OF THE INVENTION

Applicant has discovered a method of limiting contamination in waste disposal wells by injecting a mobility buffer slug consisting of an oil-external or water-external micellar dispersion before the contaminating materials. The size of the buffer depends on an estimate of the total waste to be injected over the life of the well. Generally from about 0.1 to about 25 percent formation pore volume (based on the anticipated pore volume necessary to receive the total, anticipated, waste material) and preferably 1-10 percent is useful. The mobility ratio should be favorable, i.e., the mobility of the micellar dispersion should be sufficiently low to protect against fingering. The mobility buffer can have mobilities graded from a low at the front to a high at the rear, preferably the mobility at the rear is about equal to the mobility of the waste materials being pumped in the aquifer. Also, the mobilities of the buffer can be graded in a logarithmic fashion as taught in U. S. Pat. No. 3,467,187 to Gogarty et al.

After the mobility buffer is injected into the well, the waste material is injected. If desired, pumping wells can be drilled ahead of the advancing buffer front to withdraw the original uncontaminated aquifer fluid.

PREFERRED EMBODIMENTS OF THE INVENTION

The mobility buffer is an oil-external or water-external micellar dispersion. The term micellar dispersion is meant to include microemulsion, "transparent" emulsion, and micellar solution. The micellar dispersion is composed of hydrocarbon, aqueous medium, surfactant, and optionally, cosurfactant and/or electrolyte. Other components, e.g., bactericides, corrosion inhibitors, etc. can be added if desired. Examples of volume amounts include from 2 percent to about 90 percent hydrocarbon, about 1 percent to about 95 percent aqueous medium, at least about 4 percent surfactant, about 0.01 to about 20 percent or more of cosurfactant (also identified as semi-polar organic compound and cosolubilizer) and about 0.001 to about 5 percent or more (based on the aqueous medium) of electrolyte. The hydrocarbon can be crude oil, a partially refined fraction of crude oil, and refined fractions of crude oil and synthetic hydrocarbons. The surfactant can be cationic, anionic or nonionic. The aqueous medium can be soft water or it can contain salts and can be a relatively briny water. The cosurfactant can be a monohydric or polyhydric alcohol, ketone, amine, ester, aldehyde, or like compound containing 1–20 or more carbon atoms. The electrolyte is preferably inorganic base, inorganic acid or inorganic salt, but any water-soluble electrolyte is useful with the invention. Examples of specific micellar dispersions useful with this invention and particular components to make up the micellar dispersion can be found in U. S. Pat. No. 3,254,714 to Gogarty et al.; U.S. Pat. No. 3,266,570 to Gogarty; U.S. Pat. No. 3,275,075 to Gogarty et al.; U.S. Pat. No. 3,297,084 to Gogarty et al.; U.S. Pat. No. 3,307,628 to Sena; U.S. Pat. No. 3,330,343 to Tosch et al.; U.S. Pat. No. 3,356,138 to Davis et al.; U.S. Pat. No. 3,412,791 to Gogarty; U.S. Pat. No. 3,467,187 to Gogarty et al.; U.S. Pat. No. 3,476,184 to Davis; U.S. Pat. No. 3,497,006 to Jones et al.; U.S. Pat. No. 3,506,070 and U.S. Pat. No. 3,506,071 to Jones; U.S. Pat. No. 3,330,344 and U.S. Pat. No. 3,348,611 to Reisberg; U.S. Pat. No. 3,512,586 to Holm; U.S. Pat. No. 3,373,809 to Cook, Jr. et al., etc. The mobility of the micellar dispersion can be adjusted, as taught in the above patents, by regulating the electrolyte content, the cosurfactant, etc. In addition, mobility reducing agents can be incorporated into either the internal phase or the external phase or both phases of the micellar dispersion. For example, oil soluble high molecular weight polymers can be incorporated into the hydrocarbon phase to decrease the mobility, i.e., increase the viscosity, of the micellar dispersion whereas water-soluble mobility agents or viscosity increasing agents can be incorporated into the water phase of the micellar dispersion to accomplish the same objective. Examples of water-soluble agents include polysaccharides, partially hydrolyzed, high molecular weight polyacrylamides such as the "Pusher" polymers marketed by Dow Chemical Company, Midland, Mich., high molecular weight polymers (especially anionic) which exhibit viscosity increasing properties or mobility reducing properties, and agents such as sugars, dextrans, carboxymethylcellulose, amines, glycerine, alcohols, etc. and mixtures of the above which have sufficient molecular weight character to impart viscosity increasing characteristics to the water. If it is desirable to inject relatively high viscosity dispersions, examples of such micellar dispersions can be found in copending patent application identified as U. S. Ser. No. 20,101 filed Mar. 16, 1970 by Marion O. Son, Jr.

Waste disposal fluids containing strong acids and bases, etc. and even divalent cations such as calcium and barium in large concentrations may adversely affect the viscosity characteristics of the micellar dispersion; e.g., they may tend to lower its viscosity. Such degradation can be inhibited by insulating the micellar dispersion slug from the waste materials. Water can be used as the insulating material or spacer slug. Volume amounts of the spacer slug can be about equal to the volume of mobility buffer injected. Preferably, the insulating or spacer fluid injected after the micellar dispersion slug will have a mobility about equal to the mobility of the contaminating fluid injected into the aquifer, i.e., very small amounts of mobility reducing agent can be added to the spacer slug.

Preferably, the mobility buffer is injected before the waste material is injected into the well, however, it is recognized that special mobility buffer injection wells can be employed at distant points in the aquifer between the central waste disposal well and a distant fresh water pumping well. This technique conserves the portion of the aquifer still uncontaminated by the advance of waste disposal fluid. It is also recognized that the mobility buffer can be "positioned" in the aquifer by various techniques known to the art such as removing fluids from at least one other well in fluid communication with the aquifer so as to induce said mobility buffer to flow into desired positions.

An additional advantage of the micellar dispersion is that it can be designed to solubilize hydrocarbon, etc. off of the reservoir rock and thus "clean" the reservoir before the contaminating fluid is injected. This may be desired to obtain increased relative permeabilities to the flow of the material within the reservoir, to prevent or inhibit undesired reactions of the contaminating materials with certain materials within the reservoir, etc.

It is not intended that this invention be limited by the specifics taught above. Rather, all equivalents obvious to those skilled in the art are intended to be incorporated within the scope of the invention as defined within the specification and appended claims.

What is claimed is:

1. A process of inhibiting fingering of contaminating fluids in an underground reservoir wherein the contaminating fluids are injected into the reservoir through an injection means, the method comprising injecting into the reservoir in advance of the contaminating fluids, a micellar dispersion having sufficiently low mobility to reduce the fingering tendency of the contaminating fluids into portions of the reservoir.

2. The process of claim 1 wherein the micellar dispersion is comprised of hydrocarbon, aqueous medium, and surfactant.

3. The process of claim 2 wherein the micellar dispersion contains cosurfactant and/or electrolyte.

4. The process of claim 2 wherein the micellar dispersion is comprised of about 2 to about 90 percent hydrocarbon, about 1 to about 95 percent water and at least about 4 percent surfactant, the percents based on volume.

5. The process of claim 1 wherein at least the front portion of the micellar dispersion has a mobility about equal to or less than about the mobility of formation fluids in front of the micellar dispersion.

6. The process of claim 1 wherein at least the back portion of the micellar dispersion has a mobility about equal to or greater than about the mobility of the front portion of the contaminating fluids flowing in the formation.

7. The process of claim 1 wherein an aqueous insulating slug is injected between the micellar dispersion and the contaminating fluids to inhibit degradation of the micellar dispersion by the contaminating fluids.

8. The process of claim 1 wherein the micellar dispersion contains a mobility reducing agent in either the hydrocarbon phase or the water phase, or optionally, both phases.

9. A process of limiting aquifer contamination of waste materials being injected into an aquifer through an injection means in fluid communication with the aquifer, the method comprising injecting into the aquifer in advance of the waste materials about 0.1 to about 25 percent formation pore volume, based on the anticipated pore volume to be occupied by the total amount of waste materials to be injected, of a micellar dispersion having a sufficiently low mobility to inhibit the tendency of the waste materials to finger into at least portions of the aquifer.

10. The process of claim 9 wherein the micellar dispersion is comprised of hydrocarbon, aqueous medium, surfactant, and optionally cosurfactant and/or electrolyte.

11. The process of claim 9 wherein at least the front portion of the micellar dispersion has a mobility about equal to or less than about the mobility of the formation fluids flowing ahead of the micellar dispersion.

12. The process of claim 9 wherein at least the back portion of the micellar dispersion has a mobility about equal to or greater than about the mobility of the front portion of the waste materials flowing in the formation.

13. The process of claim 9 wherein an aqueous insulating slug is injected after the micellar dispersion and before the waste materials to prevent at least immediate degradation of the mobility of the micellar dispersion.

* * * * *